Dec. 13, 1966    E. J. PARSI    3,291,713
REMOVAL OF WEAKLY BASIC SUBSTANCES FROM
SOLUTION BY ELECTRODEIONIZATION
Filed May 27, 1964    2 Sheets-Sheet 1
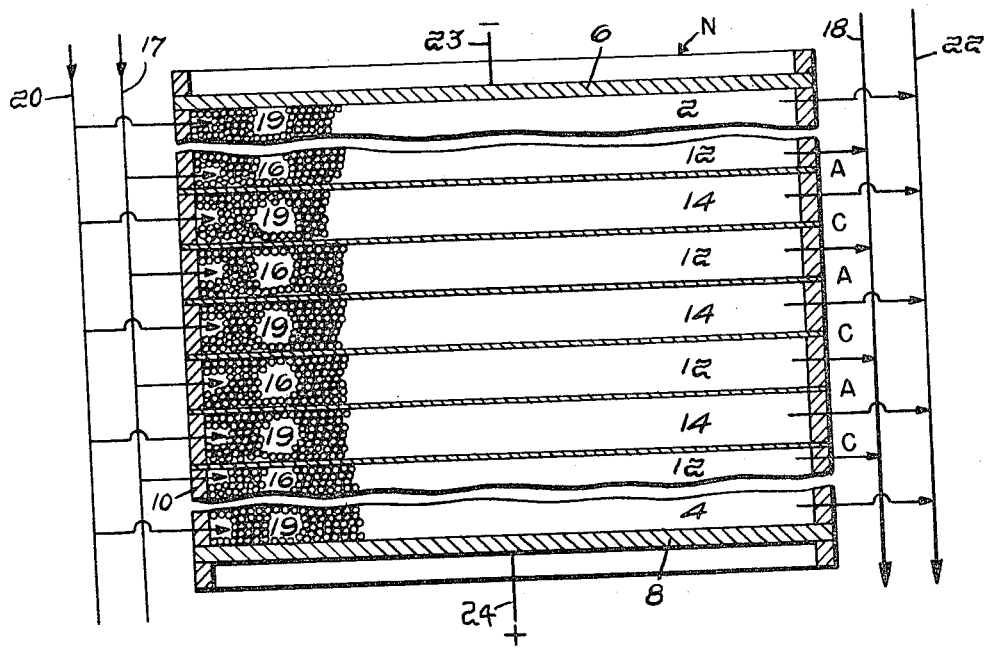
A = ANION PERMEABLE MEMBRANE
C = CATION PERMEABLE MEMBRANE
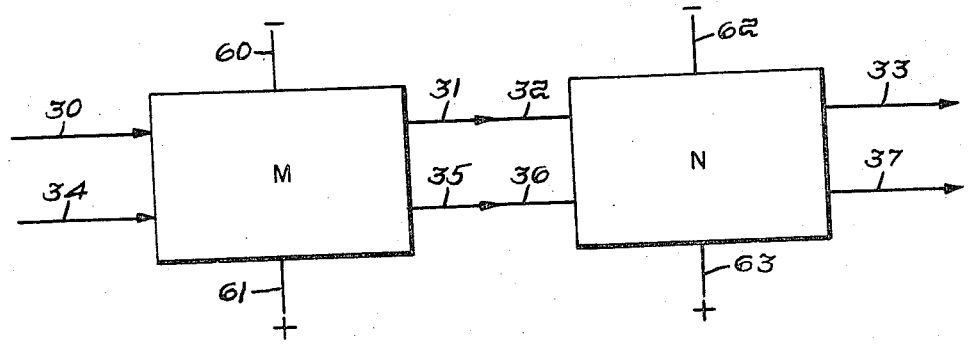
Inventor:
Edgardo J. Parsi,
by Aaron Tushin
Attorney Dec. 13, 1966

E. J. PARSI 3,291,713

REMOVAL OF WEAKLY BASIC SUBSTANCES FROM
SOLUTION BY ELECTRODEIONIZATION

Filed May 27, 1964

A = ANION PERMEABLE MEMBRANE
C = CATION PERMEABLE MEMBRANE

Inventor:
Edgardo J. Parsi,
by
Attorney

United States Patent Office 3,291,713
Patented Dec. 13, 1966

3,291,713
REMOVAL OF WEAKLY BASIC SUBSTANCES FROM SOLUTION BY ELECTRODEIONIZATION
Edgardo J. Parsi, Cambridge, Mass., assignor to Ionics, Incorporated, Cambridge, Mass.
Filed May 27, 1964, Ser. No. 370,631
15 Claims. (Cl. 204—180)

This application is a continuation-in-part of my copending application Serial No. 174,147, now U.S. Patent No. 3,149,061, filed on February 2, 1962.

This invention relates to apparatus and processes for the substantially complete removal of dissolved substances from liquids under the influence of an electric current. More particularly it relates to the removal of weakly ionized bases from said liquids by electrodeionization. Specifically the invention relates to a process for removing strongly ionized electrolytes and weakly ionized bases from aqueous solutions containing a mixture of the same. Application Serial No. 174,147 is directed to apparatus and methods for removing silica and weakly ionized acids from aqueous solutions of strong electrolytes.

It is the object of this present invention to provide a process and apparatus for the continuous and substantially complete removal of dissolved substances from liquids, in particular the removal of weakly ionized basic substances such as the amines and ammonium hydroxide from aqueous solutions. The invention is applicable to the removal of primary, secondary, and tertiary amines having aromatic, alicyclic or aliphatic structures. Such aromatic amines, for example, would include among others aniline and pyridine. The alicyclic amines would include, for example, piperidine. The aliphatic amines would preferably include the alkyl amines and amino alcohols.

This invention provides an electrodeionization apparatus of the multimembrane type in which the spaces or liquid compartments defined by the ion-exchange membranes are filled or bridged by fluid permeable beds of ion-exchange material which provides an electrical conductive path since the liquid passing through the filled resin compartments may have a high electrical resistance. The filler ion-exchange material also performs the function of adsorbing the last traces of weakly ionized substances in the same manner as occurs in the non-electric resin bed methods of deionization, but with the advantage of avoiding a separate step for regeneration of the exhausted ion-exchange material. According to the present invention, the exchange filler materials are continuously and automatically regenerated while remaining within the liquid compartments. This is accomplished by operating the electrodeionization apparatus at current densities sufficient to produce polarization at the liquid interface of the membranes or resin particles resulting in the dissociation of water. The ions thus formed are used advantageously to regenerate the exchange material located in the diluting compartments. For the purposes of this disclosure, polarization is defined as the dissociation of water molecules into hydrogen and hydroxyl ions. In the operation of membrane units, so-called polarization films can form adjacent to the inner surfaces of those membranes that define the desalting compartments. This phenomenon occurs if a high current density is used whereby the film of liquid which is in immediate contact with the membrane or resin interface becomes depleted of ions, so that further current can only be transferred by the hydrogen and hydroxyl ions thereby formed at the depleted film. Polarization is thoroughly discussed in a publication called "Limiting Currents in Membrane Cells" by Rosenberg and Tirrell, Industrial & Engineering Chemistry, volume 49, page 780, April 1957.

These and various other objects, features and advantages of the invention will appear more fully from the detailed description which follows, accompanied by the drawings. To better understand the invention, the description is made with specific reference to certain preferred embodiments and with reference to the demineralization of water containing highly ionized salts and amines; however, it is not to be construed as limited thereto except as defined in the appended claims. By way of example, the use of this invention for the substantially complete demineralization of water will now be described in detail with reference to the accompanying drawings in which:

FIGURE 1 is a side elevational, schematic sectional view of one embodiment of this invention for the removal of weakly basic substances.

FIGURE 2 is a diagrammatic sketch of another embodiment of this invention employing separate electrodeionizing units for strongly ionized salt removal and also removal of weak bases such as pyridine.

Figure 3:
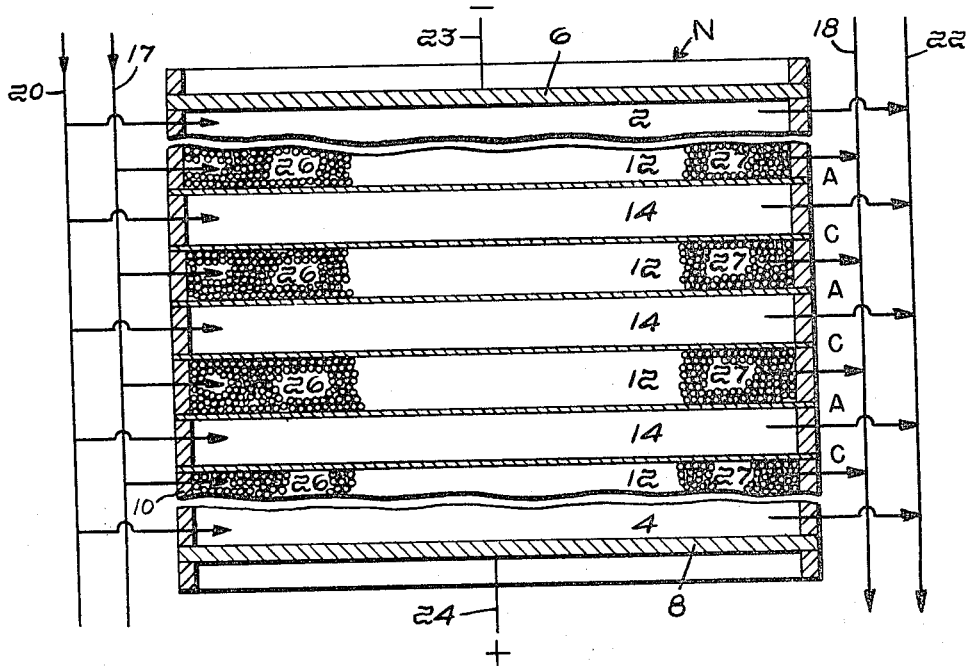
FIGURE 3 represents a diagrammatic sketch of another embodiment of FIGURE 2, wherein the arrangement of separate units are combined in a single unit for the removal of both strongly ionized materials and weakly ionized basic substances from aqueous solutions containing a mixture of the same.

FIGURE 1 represents a multi-compartment unit for the removal of weakly ionized bases from liquids, in particular the removal of the weak base from a water which is relatively free from dissolved highly ionized salts. The unit N comprises a plurality of compartments or chambers, the two end chambers being the cathode chamber 2 and the anode chamber 4 having disposed respectively therein a negative electrode or cathode 6 and the positive electrode or anode 8. Between the electrodes is a stack of ion-exchange permeable membranes of cations and anions arranged alternately and separated from each other by gasketing spacers 10 so as to define a plurality of alternating diluting chambers 12 and concentrating or flushing chambers 14. There are many commercially available ion-permselective membranes which may be employed. The manufacture and properties of cation-permselective membranes is disclosed in U.S. Patents No. 2,702,272; No. 2,730,768; No. 2,731,408; and No. 2,731,411; similarly, for anion-permselective membranes, in U.S. Patents No. 2,730,768; No. 2,800,445; and No. 2,860,097. The diluting chambers contain therein a fluid-permeable bed or filler 16 comprising granular, spherical or fibrous shapes of a strong acidic cation exchanger such as "Dowex 50" which is a commercially available sulfonated copolymer of styrene and divinyl benzene. Inlet means for feeding the solution to be treated to the diluting chambers 12 are provided for by manifold inlet 17, and outlet means for the treated solution are indicated by manifold 18. Similarly, the concentrating chambers 14 and electrode chambers 2 and 4 may be filled or packed with a fluid-permeable, ion-exchange material 19. Since the purpose of the filler in the concentrating and electrode chambers is to form a supporting conductive bridge between the spaced membranes, said material can be composed of anion or cation exchangers alone, or preferably an intimate mixture of both. Where the wash solution in the concentrating and electrode chambers contains a sufficient amount of ions to carry current across said cells, no conductive filler material is necessary. However, where distilled water is used as the feed liquid to the concentrating chambers, it would be necessary to use filler material in said chamber to form a conductive bridge therein. The inlet means for providing a washing solution into the concentrating and electrode chambers are provided for by manifold 20, and outlet means for such waste solution is indicated by manifold 22. Means for passing a D.C. potential transversely through the stack of membranes and filled resin compartments is provided for through leads 23 and 24 from an outside source of electric current (not shown).

The operation of the electrodeionization unit of FIGURE 1 may be illustrated for example in the removal of ammonium hydroxide from a feed water which is relatively free from other dissolved ionizable material, preferably less than 10 p.p.m. of highly ionizable material. The water is fed preferably in parallel to the diluting chambers 12 by manifold conduit means 17, said liquid passing through the macroporous fillers of ion-exchange material 16 and out through effluent manifold conduit 18. Similarly, feed water or distilled water is introduced by parallel flow into concentrating chambers 14 and electrode chambers 2 and 4 by inlet manifold means 20, said liquid passing through the resin bed located therein and out by means of effluent manifold 22. The liquids in all chambers are flowed in a direction parallel to the membrane surface and at right angles to the path of the flow of electric current. Upon the impression of a polarizing current transversely across the unit, migration of ammonium cations ($NH_4^+$) from the filler resin of the diluting chambers will occur—the solution then being withdrawn from the unit substantially free from ammonia.

A possible theoretical explanation of the method of ammonia removal, that is the fixation of ammonia on the cation resin, and the regeneration of the resin into the hydrogen form may be explained as occurring in two separate steps. First, ammonia which is present in the water as ammonium hydroxide enters the diluting chamber filled with the hydrogen form of a strong acid cation exchanger, said weakly ionized base, on contact with a resin particle, is removed from the water by adsorption on said cation resin as a positively charged ammonium ion. Using the symbol $(R)^-$ for the radical of a hydrogen form cation exchanger, the reaction involved in the removal of a weakly ionized basic substance like ammonium hydroxide is as follows:

Reaction 1:

Secondly, under the force of an electrical potential, migration of the ammonium cation in the direction of the cathode occurs via the conducting bridge of cation resin particles, finally contacting and passing through the cation-permeable membrane into the adjacent concentrating or flushing chamber. Since further migration of the ammonium cation is prevented by the anion membrane barrier, said cation will collect in the concentrating chamber and be flushed out as a waste stream. To maintain ionic balance, the negatively-charged hydroxyl ions which are formed in the diluting chamber from the dissociation of water, will migrate out of said chamber but in the opposite direction to that of the ammonium cation; that is, through the anion membrane and finally ending up in the adjacent concentrating chamber. The excess hydrogen ions remaining in the diluting chamber provide the necessary acid environment for replacement of the migrating ammonium ions previously adsorbed on the cation resin, thus regenerating said filler resin back to the hydrogen form to effect further removal of ammonia from the surrounding solution. Regeneration of the cation exchange resin back to the hydrogen ($H^+$) form appears to occur under polarized operation, as follows:

Reaction 2:

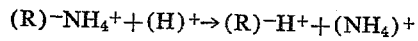

FIGURE 2 is another embodiment of the invention showing diagrammatically a method of removing strongly ionized materials, for example NaCl, and also weakly ionized bases such as pyridine from liquids by employing two separate electrodeionization units. Unit M represents a multi-compartment unit for the removal of the strongly ionized materials; and N, a unit, as described in FIGURE 1 above for the removal of weakly basic substances. Unit M is structurally identical with N except that the filler material in the diluting chambers of M unit is comprised of an intimate mixture of both a strong base anion exchanger and strong acid cation exchanger, preferably in a volume ratio of two parts anion to one part cation resin. Dowex 1, Dowex 2 and Dowex 21K are trade names for strong base anion exchanger incorporating a quaternary ammonium type structure. In general, the liquid to be treated is fed to the diluting chambers of unit M by influent means 30, said liquid passing through the filler of mixed bed resins and collecting at effluent means 31 as desalted liquid, said liquid flowing then into the diluting chambers of the pyridine removal unit N by influent means 32, passing through the cation resin filled beds and emerging as substantially ion-free liquid at effluent means 33. Simultaneously, a stream of the liquid is directed in parallel flow to the electrode and concentrating chambers of unit M by influent means 34, said liquid collecting at effluent means 35, directed into electrode and concentrating chambers of unit N by influent means 36, and emerging from said chambers at effluent means 37 as an ion-enriched stream. Means for passing a polarized direct current transversely through each unit is provided for at leads 60, 61, 62, and 63 from an outside source (not shown). The operation of the units under polarized current densities will result in the formation of hydrogen and hydroxyl ions in the diluting chambers which will effect regeneration of the ion-exchange resin beds contained therein. Prior to the liquid entering unit M, it is preferable to add to the concentrating and electrode liquid feed streams a small amount of acid to prevent possible scale formation in said concentrating chambers due to insoluble salts such as magnesium hydroxide that may otherwise accumulate therein.

For purposes of efficient removal of weakly ionized basic components, for example pyridine, it is necessary that the liquid entering unit N be relatively free of strongly ionized materials such as NaCl, etc. It is preferable that the concentration of said material be less than 10 p.p.m. The common cations, such as sodium and calcium, have a greater affinity for adsorption on the strong acid cation exchanger than the pyridine cation, and any appreciable concentration of the common cations would compete and interfere with the exchange and removal of the weak base. These interfering cations are removed by prior treatment of the liquid in an electrodeionization unit M as shown in FIGURE 2. If a single pass of the liquid through one M unit does not remove the required amount of salt, a series of M units can be arranged in which the liquid flows in series through each single unit, each removing in one pass an aliquot share of the salt; or, a sole unit can be employed by which the liquid to be desalted is continuously recirculated therein until the required salt removal is attained. The number of compartments or cell pairs to be employed in electrodeionization units can be varied depending upon the particular application and production rate required. A cell pair is defined as comprising a diluting and concentrating chamber, said units can therefore be comprised of a single cell pair or 100 cell pairs or more.

It can be appreciated that instead of employing units for separately removing strongly ionized materials and weakly basis substances, a single unit as shown in FIGURE 3 can be constructed to perform both removals. Said unit would contain chambers having an extra long liquid flow path area. The first portion of the inlet flow path area of the diluting chambers 12 would contain a filler 26 of mixed cation- and anion-exchange resins and the remaining latter portions (or effluent area) of the flow path area containing only a strong acid cation-exchange resin 27. The solution to be treated is passed into the filled diluting chambers, coming in contact first with the mixed cation-anion filler bed and secondly with the cation bed. Thus on applying a polarizing direct current across the unit, the highly ionized material, such as NaCl, is first removed by passage through the mixed resin bed; and the remaining weakly ionized bases, such as pyridine, is removed on further passage through the cation exchange bed. In effect, a single compact unit functions to remove dissolved electrolytes in their proper and necessary sequence.

The following examples are illustrative of the practice of this invention and are not intended to be limiting:

*Example 1*

An electrodeionization unit of the design of FIGURE 1 comprising five cell pairs was used to treat a solution of distilled water made up to contain 30 p.p.m. of pyridine. The cathod was made of stainless steel "304" and the anode of platinum. The cation-exchange membranes were made of a sulfonated copolymer of styrene and divinyl benzene and the anion-exchange membranes of a quaternized copolymer of 2-vinyl pyridine and divinyl benzene. The filler material in the diluting chambers comprised beads of "Dowex 50," a strong acid cation exchanger; the concentrating and electrode chambers contained a 50–50 mixture of "Dowex 50" and a strong basic anion exchanger, "Dowex 1." The feed water containing the pyridine was fed to the diluting chambers at a rate of 170 milliliters per minute. The feed water was also passed to the concentrating and electrode chambers at this same rate.

The unit was operated at a current density of 3 to 3.5 milliamps per square centimeter of membrane area and at steady state conditions the water emerging from the diluting chambers analyzed to less than 0.10 p.p.m. of pyridine. When the D.C. current to the unit was shut off, no pyridine removal was effected. On reapplying current, removal was immediately re-established.

*Example 2*

A combination of electrodeionization units as described in FIGURE 2 was employed for removal of highly ionized salts and pyridine. The combination comprised a first and second M unit for the salt removal and a third unit N for pyridine removal. The same type membranes and electrodes were employed in all three units as was previously described in Example 1 above. The two salt removing M units comprised five cell pairs each, the diluting chambers containing an intimate mixture of two parts by volume of Dowex 1 (a strong base anion exchanger) to one part of Dowex 50 (a strong acid cation exchanger). The third unit N comprised four cell pairs, otherwise it was similarly constructed as the unit of Example 1 above.

The water to be treated was Cambridge, Massachusetts, tap water having a specific resistance of ~7000 ohm-centimeter (~100 p.p.m. of highly ionized salts) to which 10 p.p.m. of pyridine was added. This water was fed to the first unit, passing then in series flow through the second and third units and emerging in two streams, an ion-free dilute stream and a concentrated ion stream. The flow rates to the diluting and concentrating streams were 170 milliliters per minute. Sulfuric acid was added to the concentrating and electrode feed water to obtain a pH of about 6 or less. A polarizing direct current was applied across each unit and at steady state operation the following results were obtained:

The first salt removal unit M operated at 125 milliamps and at 20 volts.

The effluent from the diluting stream gave a specific resistance of 100,000 ohm-centimeters corresponding to ~5 p.p.m. of dissolved highly ionized salts. There was no pyridine removal effected.

The second salt removal unit M operated at 60 milliamps at 15 volts and produced a diluting stream effluent of one million ohm-centimeters water, which corresponds to ~0.1 p.p.m. of dissolved highly ionized salts. There was no noticeable pyridine removal effected by this unit.

The third unit N for pyridine removal operated at 50 milliamps and 10 volts. The product effluent from this unit contained less than 0.07 p.p.m. of pyridine and had a specific resistance of better than 2 million ohm-centimeters.

*Example 3*

Cambridge tap water containing 10 p.p.m. of aniline, a weakly ionized basic substance, was treated in the same apparatus and by the same method as described in Example 2. The final water product contained less than 0.10 p.p.m. of aniline and had a specific resistance of about two million ohm-centimeters.

*Example 4*

A single electrodeionization unit of the general design of FIGURE 3 was employed to remove salts and pyridine from Cambridge, Massachusetts tap water. This unit differed from the unit employed in Example 1 in three respects:

(1) The length of the flow path of all chambers was four feet long—as compared to the one-foot length employed in the unit of Example 1;

(2) Commencing at the inlet flow area of all the diluting chambers for a distance of three feet into the flow path, the filler material of ion-exchange resin was composed of an intimate mixture of one part by volume of a strongly acid cation exchanger to one part of a strongly basic anion exchanger. The remaining one-foot length of the flow path area contained a filler of only strongly acid cation exchanger; and (3) The concentrating and electrode chambers employed no filler material.

In effect, this present unit combined the separate salt removal and pyridine removal units of Example 2 into a single unit performing the same function.

The tap water containing 10 p.p.m. of pyridine was fed into the inlet sections of all diluting chambers at a total flow rate of 175 milliliters per minute. The same tap water, adjusted to a pH of 5.6 with sulfuric acid, was fed into the concentrating and electrode chambers at the same flow rate.

The unit was operated at a current of 200–250 milliamps which was sufficient to cause polarization within the diluting chambers. At steady state operation the water emerging from the diluting chambers contained less than 0.15 p.p.m. of pyridine and had a specific resistance of 1.8 to 2.0 million ohm-centimeters.

*Example 5*

Cambridge tap water containing about 10 p.p.m. of ethanolamine (an amino alcohol) was demineralized in the same manner as previously described in Example 4. The resulting water contained about 0.20 p.p.m. of the amino alcohol and measured better than 1.8 million ohm-centimeter in resistance.

What is claimed is:

1. A process for the removal of strongly ionized electrolytes and weakly ionized bases from aqueous solutions containing a mixture of the same, the process comprising subjecting the solutions to electrodeionization in a series of at least two separate electrodeionization units, each unit of the series comprised of a cathode chamber at one terminal end, an anode chamber at the opposite terminal end, said chambers containing a cathode and an anode respectively, the body of each unit as defined by the terminating electrodes comprising a plurality of alternating diluting and concentrating chambers defined by alternating cation and anion ion-exchange permeable membranes, at least the diluting chambers of the last electrodeionization unit of the series containing a fluid permeable filler of ion-exchange material, said material of said diluting chambers comprising a strong acid cation exchanger, at least the diluting chambers of the other electrodeionization units of the series containing a fluid-permeable filler of ion-exchange material, said material of said diluting chambers comprising a mixture of strong base anion exchanger and strong acid cation exchanger, introducing liquids to be treated into the diluting compartments of the unit first in series and withdrawal of said liquid therefrom, further passing said liquid successively into and out of the diluting compartments of each remaining unit, introducing a liquid into the concentrating and electrode chambers of said unit first in series and withdrawal of said liquid therefrom, passing said liquid successively into and out of said chambers of each remaining unit, passing a direct current potential transversely across the body of each of said units of the series, said current being sufficient to dissociate water into hydrogen and hydroxyl ions within the diluting chambers, and withdrawing separate streams of deionized liquid and ion-enriched liquid from said last unit of the series.

2. The process of claim 1 wherein the weakly ionized basic component of the liquid to be treated is selected from the group consisting of ammonium hydroxide, aliphatic, alicyclic and aromatic amines.

3. The process of claim 1 wherein the weakly ionized basic component of the liquid to be treated comprises ammonium hydroxide.

4. The process of claim 1 wherein the weakly ionized basic component comprises aniline.

5. The process of claim 1 wherein the weakly ionized basic component comprises pyridine.

6. The process of claim 1 wherein the weakly ionized basic component comprises ethanolamine.

7. The process of claim 1 wherein the effluent from the concentrating chambers is removed as an electrolyte-enriched product.

8. A process for the removal of strongly ionized electrolytes and weakly ionized bases from aqueous solutions containing a mixture of the same, comprising passing said aqueous solution as a feed stream through the chambers of an electrodeionization unit comprised of alternating diluting and concentrating chambers defined by alternating cation- and anion-permselective membranes, the terminal chambers of which contain cathode and anode electrodes, at least said diluting chambers containing a fluid permeable filler of ion-exchange material, said material of the diluting chambers being selected from the group consisting of strongly basic and strongly acid exchangers, wherein the initial area of the diluting chambers, commencing at the inlet section, contains a filler material comprising an intimate mixture of strongly acid cation and strongly basic anion exchangers, and the remaining latter area of the diluting chambers terminating at the effluent section of said chambers containing a filler material comprised of strongly acid cation exchanger, passing a direct current transversely through said chambers and membranes, said current being sufficient to dissociate water into hydrogen and hydroxyl ions within the diluting chambers, and removing the effluent from said diluting chambers as a liquid product substantially free of strongly ionized electrolytes and containing a lesser amount of weakly ionized bases than was originally present in said feed solution.

9. The process of claim 8 wherein the weakly ionized basic component of the liquid to be treated is selected from the group consisting of ammonium hydroxide, aliphatic, alicyclic and aromatic amines.

10. The process of claim 8 wherein the weakly ionized basic component comprises aniline.

11. The process of claim 8 wherein the weakly ionized basic component comprises pyridine.

12. The process of claim 8 wherein the weakly ionized basic component comprises ethanolamine.

13. The process of claim 8 wherein the weakly ionized basic component comprises ammonium hydroxide.

14. An apparatus for the removal of strongly ionized electrolytes and weakly ionized bases from an aqueous solution containing a mixture of the same, comprising in combination a series of multi-compartment electrodeionization units of at least two units, each unit comprised of a cathode chamber at one terminal end, an anode chamber at the opposite terminal end, said chambers containing a cathode and an anode respectively, each unit comprising a plurality of alternating diluting and concentrating chambers defined by alternating cation and anion permeable membranes, at least the diluting chambers of the last unit of the series containing a fluid-permeable filler of ion-exchange material, said material of said diluting chambers comprising a strong acid cation exchanger, at least the diluting chambers of all other units of the series containing a fluid-permeable filler of ion-exchange material, said material of said diluting chambers comprising a mixture of strong base anion exchanger and strong acid cation exchanger, means for introducing liquids to be treated into the diluting compartments of the unit first in series with exit means for withdrawal of said liquid, means for further passing said liquid successively into and out of the diluting compartments of each remaining unit, and final means of withdrawal of said liquid from the last unit of the series, means for introducing a liquid into the concentrating and electrode chambers of said unit first in series with exit means for withdrawal of said liquid, means for further passing said liquid successively into and out of said chambers of each remaining unit, and final means of withdrawal of said liquid from the last unit of the series, and means of passing a direct current transversely across the membranes and filled chambers of each unit.

15. A multi-compartment electrodeionization unit for the removal of strongly ionized electrolytes and weakly ionized bases from an aqueous solution containing a mixture of the same comprising, in combination, a plurality of chambers, the two end chambers comprising the electrode chambers, one chamber having disposed therein a negative electrode, the other a positive electrode, said unit comprising a plurality of alternating diluting and concentrating chambers defined by ion-exchange permeable membranes of cations and anions arranged alternately, at least said diluting chambers containing a fluid-permeable filler of ion-exchange material, the initial area of said diluting chambers, commencing at the inlet section of said chambers containing a filler material comprising an intimate mixture of strongly acid cation and strongly basic anion exchanger and wherein the remaining latter area terminating at the effluent section of said chambers containing a filler material comprising strongly acid cation exchanger; means for introducing liquid to be treated into the filled diluting chambers and means for a withdrawal of the liquid from said chambers, means for passing liquid into the concentrating and electrode chambers, and outlet means for withdrawal of liquid from said chambers, and means for passing a direct current transversely across the membranes and chambers.

References Cited by the Examiner

UNITED STATES PATENTS 2,815,320  12/1957  Kollsman _____ 204—301
2,923,674   2/1960  Kressman _____ 204—180
3,014,855  12/1961  Kressman _____ 204—180

FOREIGN PATENTS 565,892  11/1958  Canada.
815,154   6/1959  Great Britain.
866,471   4/1961  Great Britain.

JOHN H. MACK, *Primary Examiner.*

E. ZAGARELLA, *Assistant Examiner.*